350-166. SR 06-15-71 XR 3,585,281

United States Patent [11] 3,585,281

[72] Inventor Harold O. W. Jordan
Stamford, Conn.

[21] Appl. No. 692,743
[22] Filed Dec. 22, 1967
[45] Patented June 15, 1971
[73] Assignee Printing Development, Inc.
New York, N.Y.

[54] APPARATUS FOR OPTICALLY RESOLVING THE LIGHT DERIVED FROM THE SCANNING OF A TONAL IMAGE INTO COLOR COMPONENTS
16 Claims, 9 Drawing Figs.

[52] U.S. Cl. 178/5.4, 178/7.86, 350/166
[51] Int. Cl. H04n 5/42
[50] Field of Search 178/54.0, 5.4 TCC, 5.4, 7.86; 350/166, 169, 171, 173; 95/125

[56] References Cited
UNITED STATES PATENTS

| | | | |
|---|---|---|---|
| 2,335,180 | 11/1943 | Goldsmith | 178/7.86 |
| 3,085,468 | 4/1963 | Hehn | 350/166 |
| 3,196,205 | 7/1965 | Bedford | 178/5.4 TCC |
| 3,495,029 | 2/1970 | Underhill | 350/171 UX |

*Primary Examiner*—Robert L. Griffin
*Assistant Examiner*—Donald E. Stout
*Attorney*—Brumbaugh, Graves, Donohue and Raymond

ABSTRACT: A color transparency is scanned by a beam from a spot moving over the screen of a cathode-ray tube. The modulated beam is divided by neutral beam splitters into secondary beams color filtered only by dichroic filters to yield color component beams incident on photomultipliers. Each beam-filter angle of incidence is variable between 0° and 20°. An image of the copy is projected onto the tube screen by a light beam chopped at a rate rendering that image flickerless.

INVENTOR.
HAROLD O. W. JORDAN
BY Brumbaugh, Free
Graves & Donohue
his ATTORNEYS

INVENTOR.
HAROLD O. W. JORDAN
BY Brumbaugh, Free, Graves & Donohue
his ATTORNEYS INVENTOR.
HAROLD O. W. JORDAN
BY Brumbaugh, Free, Graves & Donohue
his ATTORNEYS INVENTOR.
HAROLD O. W. JORDAN
BY Brumbaugh, Free, Graves & Donohue
his ATTORNEYS INVENTOR.
HAROLD O. W. JORDAN
BY Brumbaugh, Free, Graves & Donohue
his ATTORNEYS

APPARATUS FOR OPTICALLY RESOLVING THE LIGHT DERIVED FROM THE SCANNING OF A TONAL IMAGE INTO COLOR COMPONENTS

This invention relates generally to systems for scanning a tonal image and for optically processing the light derived from such scanning. More particularly, this invention relates to improvements which implement in such system the scanning of the image by cathode-ray tube means and/or the resolving into color components of the light derived from the scanning of that image.

For a better understanding of the invention, reference is made to the following description and to the accompanying drawings wherein.

Figure 1:
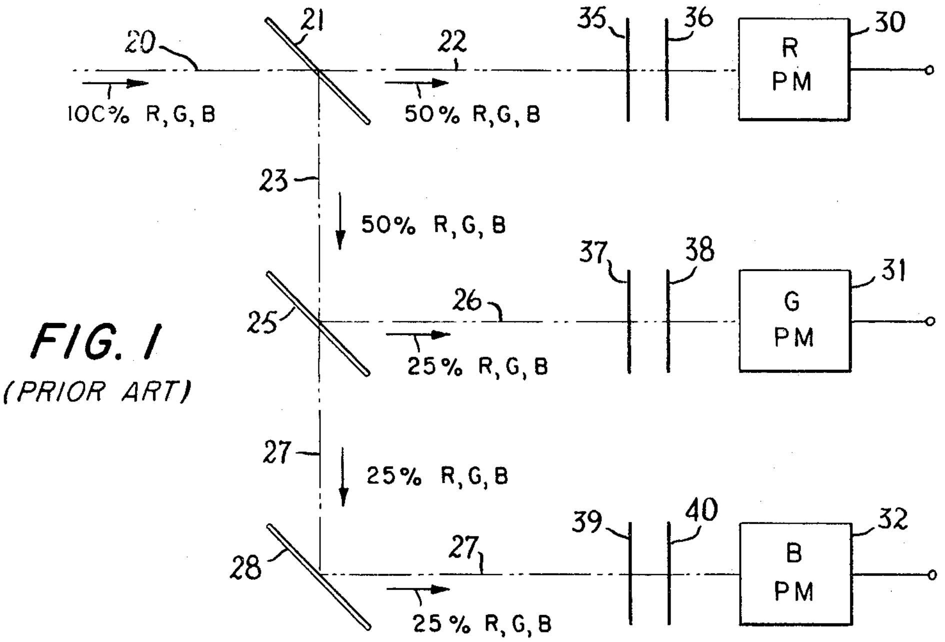
FIG. 1 (PRIOR ART)
FIG. 1 is a schematic diagram of a prior art system for resolving an input light beam into color components.

The color analyzing system shown in FIG. 1 has long been known in the art. In that system an input beam 20 is derived by the scanning of a color transparency or other original (not shown) such that the beam is modulated in color and in intensity. Beam 20 impinges at a 45° angle of incidence on a neutral beam splitter 21 provided by, say, a half-silvered mirror. A characteristic of such a neutral beam splitter is that it transmits all wavelengths of a visible light incident thereon without any wavelength-selective filtering action. Thus, if the incident beam 20 is, say, constituted of the color components of red, green and blue light which are each at nominal 100 percent strength in that beam, and if beam splitter 21 is a 50 percent transmitter, then (for zero light absorption) the beam 22 which emerges after transmission is constituted of those same color components at 50 percent nominal strength for each. The light not transmitted through beam splitter 21 is reflected to form a beam 23 likewise constituted (for zero light absorption) of red, green and blue color components of which each is at 50 percent nominal strength.

The beam 23 impinges at a 45° angle of incidence on a beam splitter 25 similar to element 21. Splitter 25 serves to divide the light in beam 23 into a reflected beam 26 constituted (for zero light absorption) of red, green and blue components each at 25 percent nominal strength and into a transmitted beam 27 constituted (for zero light absorption) of red, green and blue components each at 25 percent nominal strength. The transmitted beam 27 may be further reflected by a mirror 28.

For the reasons stated, the secondary beams 22, 23, 26 and 27 derived from the primary or input beam 20 are all of the same wavelength composition as beam 20 although of lesser strength than that primary beam. That is, if beam 20 is a white light having a particular curve of spectral energy distribution with wavelength, then beams 22, 23, 26 and 27 are also beams of white light of which each is characterized by that same spectral energy distribution curve.

A color analyzer of the sort shown in FIG. 1 is used in connection with scanner machines which are well known in the prior art, and which derive color separations from a scanned original color transparency. Such a scanner has photomultipliers 30, 31 and 32 which respond to, respectively, the beams 22, 26 and 27 to produce respective electric signals representative of the red, green and blue color components of scanned tone values of the original color transparency. Those signals are electronically processed and are then used to control glow lamps which expose cyan, magenta, yellow and black color separation images on different ones of a plurality of sensitized photographic films. For a further description of machines of this type, reference is made to U.S. Pat. No. 2,873,312 issued Feb. 10, 1959 in the name of W. W. Moe and to U.S. Pat. No. 3,194,883 issued July 13, 1965 in the name of Austin Ross and to the patents cited in connection with those two enumerated patents.

In order for the photomultipliers 30, 31 and 32 to derive the red, green and blue color component signals from, respectively, the beams 22, 26 and 27 each of those beams must be color filtered before it reaches its corresponding photomultiplier. In the FIG. 1 system, such color filtering is effected by Wratten filters. Specifically, beam 22 has in it a pair of Wratten filters 35, 36 which transmit the red light of the beam to photomultiplier 30, but which absorb the green and blue components of the light incident on the filters. Similarly, beam 26 has in it Wratten filters 37, 38 which transmits green light to photomultiplier 31 but absorb the remaining light in beam 26, and beam 27 has in it the Wratten filters 39, 40 which transmit blue light to photomultiplier 32 but which absorb the remaining light of beam 27. In theory, one Wratten filter should be sufficient for each filtered beam. In practice, however, it is usually necessary to filter each beam to a photomultiplier by two or more Wratten filters in order to get the proper filtering effect.

Figure 2:
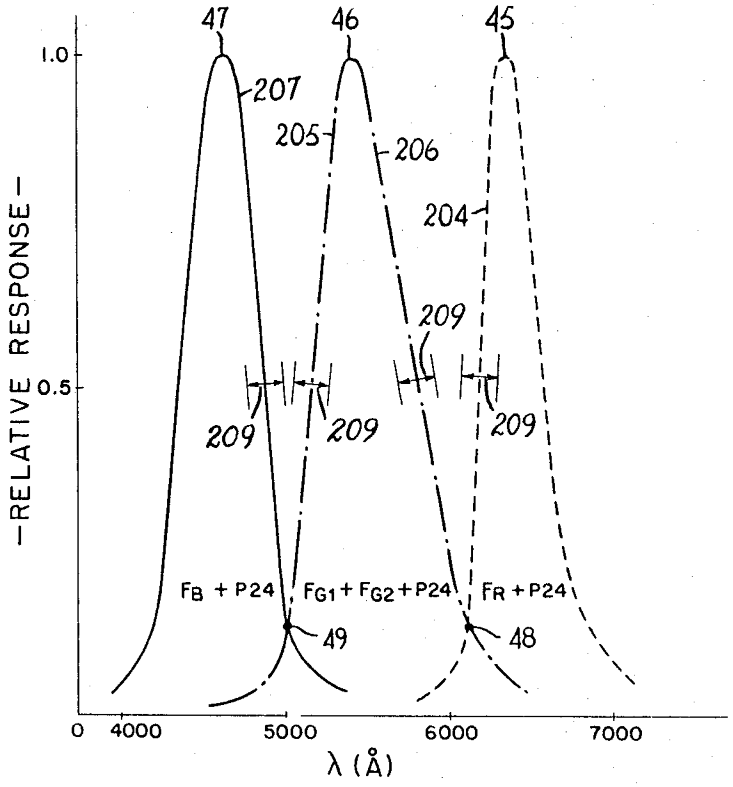
FIG. 2 is a graph of normalized wavelength band-pass curves ideally characteristic of the FIG. 1 system and other color analyzing systems.

The wavelength-energy band-pass curves for the beams incident on, respectively, the photomultipliers 30, 31 and 32 are arrived at by multiplying the combined wavelength-energy transmission characteristic of the filters in each beam by the wavelength-energy or spectral energy distribution curve of the light in beam 20 when that light is not modulated in color by the scanning of the original. FIG. 2 shows approximately ideal normalized wavelength-energy band-pass curves 45, 46 and 47 for, respectively, the beams 22, 26 and 27. Each of those curves has been designated in FIG. 2 as having a nominal peak energy value of 1.0. As shown, the three curves extend over respective effective wavelength bands which are sequentially overlapping such that the curves themselves are sequentially overlapping in wavelength. As further shown, the sequential overlapping of the curves results in an intersection point 48 of curves 45 and 46 and in an intersection point 49 of the curves 46 and 47. Both intersection points are characterized by an energy value which is about 16 percent of the peak energy value of the normalized curve and, therefore, is substantially less than 50 percent of that peak energy value.

The color analyzer system of FIG. 1 is relatively inefficient for the reason that light of a given color component in input beam 20 is attenuated both by the neutral beam-splitting action and by the light absorbing effect of the Wratten filters. For example, the red light in beam 22 for red photomultiplier 30 is attenuated from a nominal strength of 100 percent to a nominal strength of 50 percent merely by passage through the beam splitter, and, moreover, is attenuated even further during passage through the Wratten filters 35, 36 (which have an absorbing effect even on light of the wavelengths which those filters are designed to transmit). As will be evident, the attenuation of the green light in beam 26 and of the blue light in beam 27 is even worse. Thus, while the attenuation produced by the neutral beam splitting action might, standing alone, be tolerable, the combined attenuation of the beam splitters and of the Wratten filters is excessively high. As a result, upon the introduction into the art of dichroic filters, the FIG. 1 system became largely superseded by the shown FIG. 3 system which employs such dichroic filters both as beam splitters and as the principal color filtering elements.

Figure 3:
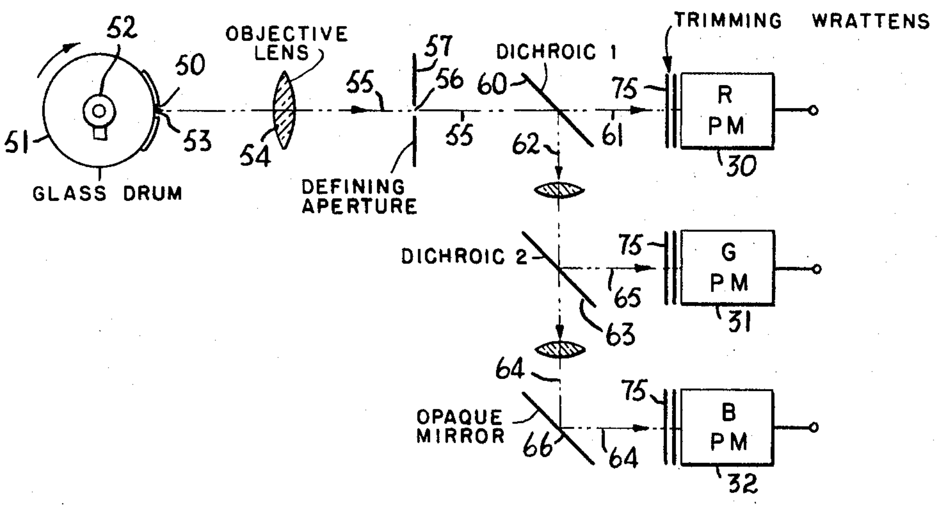
FIG. 3 (PRIOR ART)
FIG. 3 is a schematic diagram of a prior art color analyzer employing dichroic filters.

In the FIG. 3 system, an original color transparency 50 is mounted on a transparent drum 51 having therewithin a light source 52 projecting light through the drum to form on the drum's surface a spot 53 of white light which is stationary in space. Drum 51 is rotated and concurrently displaced axially an incremental step for each rotation to produce a scanning in a raster pattern of the moving copy 50 by the stationary spot 53. The light derived from such scanning is formed by an optical system 54 (represented by a lens) into a primary beam 55 passing through a defining aperture 56 in an aperture plate 57. Because the light projected from source 52 is very intense, aperture 56 can be very small in diameter and still provide sufficient light emerging from the aperture to operate the system.

Upon leaving aperture 56, beam 55 impinges at at 45° angle of incidence on a first dichroic filter 60 which transmits all the red light of beam 55 to form a secondary beam 61, and which reflects all of the green and blue light in beam 55 to thereby form a secondary beam 62. The latter beam falls at a 45° angle of incidence on a second dichroic filter 63 which transmits all the blue light in beam 62 to form a secondary blue beam 64, and which reflects all the green light in beam 62 to form a secondary green beam 65. Blue beam 64 may be further reflected by a full-silvered mirror 66. The red, green and blue beams 61, 65 and 64 are directed to, respectively, the red, green and blue photomultipliers 30, 31 and 32.

A characteristic of a dichroic filter is that, over the range of transmitted wavelengths, the transmission of light through the filter does not attenuate the energy of the transmitted light relative to the energy of the light of the same wavelength in the incident beam. That is, dichroic filter 60 hypothetically transmits 100 percent of the red light in incident beam 55 and, similarly, dichroic filter 63 transmits 100 percent of the blue light in incident beam 62. Moreover, any light not transmitted by a dichroic filter is reflected thereby. It follows that, in the FIG. 3 system, the energies of the red, green and blue light in, respectively, the beams 61, 65 and 64 as they leave the dichroic filters is the same as the energies of those light components in the primary beam 55. As so far described, therefore, the FIG. 3 system attains 100 percent efficiency in converting the light of the primary beam into red, green and blue color components.

Figure 4:
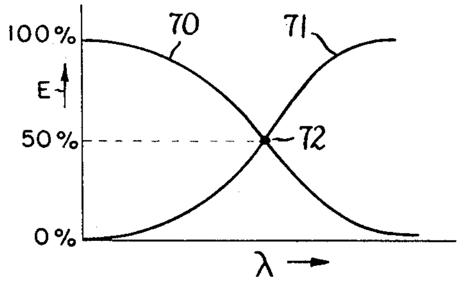
FIG. 4 is a graph of the reflection and transmission curves of a typical dichroic filter.

Referring now, however, to FIG. 4 which shows the transmission and reflection characteristics of a typical dichroic filter at a given angle of incidence to an impinging beam, the curves 70 and 71 are wavelength-energy curves of, respectively, the light transmitted through the filter and the light reflected therefrom in the instance where the impinging beam has a flat spectral energy distribution curve in the visible range such that the energy of the light in the beam is of a nominal value of 100 percent at all wavelengths in that range. Alternatively, curves 70 and 71 could be, respectively, a typical reflection curve and a typical transmission curve for a dichroic filter. In either case and because a dichroic filter reflects all light not transmitted therethrough, the two curves intersect at a point 72 which necessarily has an energy value of 50 percent relative to the 100 percent nominal energy value. To explain further, there must be in the incident beam a particular wavelength of 100 percent nominal energy value which is 50 percent transmitted and 50 percent reflected by the dichroic filter, and, also, that wavelength must be at the crossover point 72 (because a 50 percent drop of curve 70 from 100 percent is 50 percent and a 50 percent rise of curve 71 from 0 percent is 50 percent), wherefore the crossover point must be characterized by a 50 percent energy value. In this connection, a change in the angle of incidence of the beam of the filter will change the wavelength position of the crossover point but not its 50 percent energy value.

From FIG. 4, it follows that, if dichroic filters 60 and 63 were to be the only color filters used in the FIG. 3 system, the normalized red band-pass curve for beam 61 would intersect the normalized green band-pass curve for beam 65 at a point having an energy value of 50 percent relative to peak energy value. Similarly, the mentioned green curve would intersect the normalized blue band-pass curve for beam 64 at a point having an energy value of 50 percent relative to peak energy value. On the other hand, FIG, 2 indicates that the three band-pass curves for the system should intersect at points having energy values substantially less than 50 percent of peak energy. To the end, therefore, causing the band-pass curves for beam 61, 65 and 64 (as they impinge on the photomultipliers) to be workable approximations of the desired band-pass curves shown in FIG. 2, it is necessary in the FIG. 3 system to supplement the color filtering action of the dichroic filters by the color filtering action of Wratten trimming filters 75 interposed in the mentioned beam between the dichroic filters and the photomultipliers.

The need for trimming filters in the FIG. 3 system is unfortunate because, as stated, such filters are light-absorbing so as to render the system less efficient than is desirable. Moreover, because of tolerance deviations in the optics of the system from exact design values, the initially obtained color band-pass curves are characterized by deviations from ideal shape and/or wavelength position, and such deviations have to be reduced or eliminated by a trial and error technique involving the addition of other Wratten filters to the trimming filters initially employed or the replacement of one or more of those filters by other Wratten filters. That technique is not, however, well adapted to fine tune the band-pass curves because, first, those curves can not be changed except in discrete jumps by changing Wratten filters, and, second, any such Wratten filter changing produces a change in one or more operating parameters of the system which are in addition to the band-pass curves, and which in turn, must be corrected.

Figure 5:
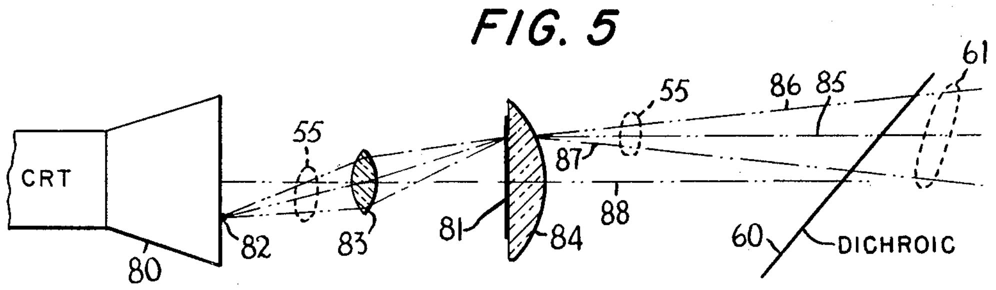
FIG. 5 is a schematic diagram of a portion of the FIG. 3 analyzer when that analyzer employs a cathode-ray tube as the source of scanning light.

A further disadvantage of the FIG. 3 system is encountered, when, as shown in FIG. 5, a stationary copy 81 is scanned by a cathode-ray tube 80. In the FIG. 5 arrangement, the electron beam of the tube is deflected to produce a scanning in a raster pattern on the screen of the tube of a spot 82 of light formed on the screen. The light from that spot passes through an aperture lens 83, the copy 81 and a collimating lens 84 to fall in a beam on the dichroic filter 60. The nominal axis for such beam is represented in FIG. 5 by the line 88 which is colinear with the central ray of the beam when spot 82 is at center position of the screen of cathode-ray tube 80.

If lens 82 were to be of very small diameter, the light from spot 82 would be converted by lens 82 into an almost cylindrical light beam of which radially opposite outside rays would have negligible angular divergence with the central ray of the beam. Because, however, the intensity of the light from the cathode-ray tube spot 82 is substantially less than the intensity of light from the spot 53 developed when drum scanning is used (FIG. 3), lens 83 must be substantially greater in diameter than aperture 56 (FIG. 3) in order to pass enough light to operate the system. The result of the relatively large diameter of the lens 83 is that the beam derived from spot 82 and emerging from lens 84 is no longer almost cylindrical but, instead, is in the form of a cone of which radially opposite outside rays 86 and 87 have substantial angular divergence from the central ray 85. It follows that, when the conical beam falls on the dichroic filter 60, the separate angles of incidence of the rays 86 and 87 with the filter will be substantially greater and substantially less respectively, than the angle of incidence which is made between the filter and ray 85.

A characteristic of a dichroic filter is that the wavelength value of the wavelength of peak energy transmitted through the filter is a function of the angle of incidence and changes rapidly when the angle of incidence is at or near 45°. From the fact just stated, it follows that the peak energy wavelength of the light transmitted through filter 60 along, respectively, the outside rays 86 and 87 will vary substantially and depart in opposite directions in respect to wavelength value from the peak energy wavelength of the light transmitted through filter 60 along the central ray 85. This large spread between the peak energy wavelength values transmitted through different parts of filter 60 when at a nominal 45° angle of incidence is a phenomenon which, in turn, produces an intolerable spreading wavelength of the band-pass curve for the red beam 61 (FIG. 3). For the same reasons, an unduly large spreading is produced of the band-pass curve for the green beam 65 and the blue beam 64.

As closely allied phenomenon, when spot 82 moves in its raster scanning pattern over the screen of tube 80, the continuous change in position of the spot produces changes from the nominal value of 45° in the angle of incidence between the filter 60 and the central ray 85 of beam 55. Because, as stated, the peak energy wavelength transmitted by a dichroic filter changes most rapidly as a function of the angle of incidence when that angle is at or near 45°, those changes in the angle of incidence of ray 85 with filter 60 will produce in the reproduction ultimately made from the FIG. 3 system an extraneous color tinting which varies in color from point to point over the reproduction.

As a result, therefore, of both the described spreading of the band-pass curves for the beams impinging on the photomultipliers and the described extraneous color tinting effect, the FIG. 3 system is unsatisfactory as a color analyzer of scanned toned values of an original in the instance where the scanning of that original is effected by a moving spot on the screen of a cathode-ray tube.

It is, accordingly, an object of this invention to provide color analyzer systems which permit fine tuning of the color band-pass curves for the system in a continuously variable manner.

A further object of this invention is to provide color analyzer systems which are free of the inefficiency introduced by the use of light-absorbing Wratten filters of other light-absorbing color filters.

Another object of this invention is to provide color analyzing systems suitable for use with a cathode-ray tube scanner developing a moving scanning spot, and, further, to provide improved cathode-ray tube scanning and color analyzing systems.

Still another object of this invention is to provide cathode-ray tube scanning systems for an original in which an image of the original is projected onto the screen of the scanning tube.

Figure 6:
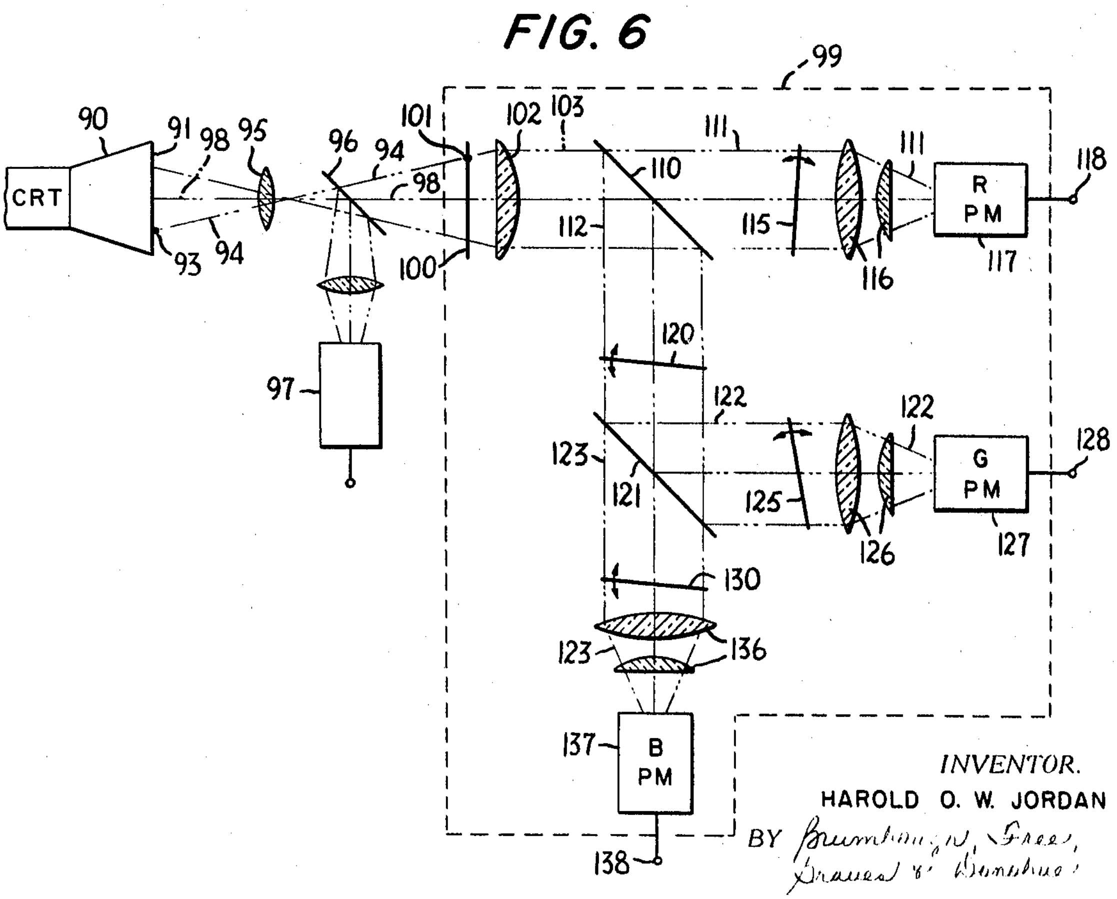
FIG. 6 is a schematic diagram of an exemplary scanning and color analyzing system according to the invention.

Those and other objects are realized by systems of the sort exemplified by the embodiment shown schematically in FIG. 6. In that figure, an electron beam of a cathode-ray tube 90 is deflected by signals supplied to the tube and generated by means described in the patent application filed concurrently herewith in the name of Harold O. W. Jordan, Michael J. Keenan and Austin Ross and entitled "Cathode-Ray Tube Scanning Systems," said application being owned by the assignee hereof. The deflection of the electron beam is such as to produce a raster scanning pattern over the tube screen 91 of a spot 93 of light generated by the impingement of the electron beam on the phosphor coating of the screen. That coating may desirably be constituted of the phosphor P24 which is excited by the electron beam to yield light having a wavelength-energy curve distribution which provides significant energy throughout most of the visible range, but which peaks in the green so as to appear whitish-green to the human eye. Other phosphors characterized by generally similar spectral energy distribution curves may also be used for the screen coating.

Light is emanated from spot 93 in the form of an unfocused beam 94 represented in FIG. 6 by the center ray of the beam. When spot 93 is at its lowermost position on the screen 91 of tube 90, the center beam ray has the position designated in FIG. 6 by the shown reference numeral 94. As spot 93 moves in a raster scanning pattern over the tube screen, beam 94 correspondingly moves as indicated in FIG. 6 by the other shown positions for the center ray. The axis 98 of beam 94 (and of the beams derived therefrom) is taken as being defined by the center ray of the beam when spot 93 is at its center position of the screen 91 of the cathode ray tube.

The beam 94 of the light from spot 93 is passed through an objective lens 95 and then through a pellicle 96 which diverts a small fraction of the beam to a monitoring photomultiplier 97. The remainder of the beam light passes to a color analyzer apparatus 99 and, within that apparatus, to a stationary color transparency 100 to form thereon a light spot 101 which scans over the transparency in a raster pattern similar in shape to the raster pattern defined by the movement of source spot 93 over the tube screen 91. The light of spot 101 passes through the transparency 100 to be modulated in color and intensity by the tone values of the transparency through which the light is transmitted. Thereafter, the modulated light is formed by a collimating lens 102 into a beam 103 having a divergence which, at most, is 5° from normal.

The axis of the primary or input beam 103 impinges at a 45° angle of incidence on a low absorption neutral beam splitter 110 (e.g., a half-silvered mirror) to be divided by that element into a secondary transmitted beam 111 and a secondary reflected beam 112. Beam 111 next passes through a dichroic filter 115 (later described in more detail) which transmits only the red range of the wavelengths of visible light. Such now red beam passes through condenser lenses 116 to impinge on a "red" photoresponsive device 117 which is preferably a photomultiplier but may be some other sort of photoresponsive means such as, say, a phototransistor. The device 117 responds to the light in beam 111 to generate at an output 118 an electrical signal representative of the red color component of scanned tone values of the transparency 100.

The beam 112 from splitter 110 first passes through a dichroic filter 120 which transmits only the range of visible wavelengths embracing the colors blue and green. Next, the axis of beam 112 impinges at a 45° angle on an additional low absorption neutral beam splitter 121, which, like the splitter 110, may be provided by a half-silvered mirror. Splitter 121 divides the secondary beam 112 into two other secondary beams, namely, a reflected beam 122 and a transmitted beam 123. The reflected beam 122 passes through a dichroic filter 125 which transmits a range of wavelengths spanning the colors green and red and overlapping with the blue-green range of wavelengths of the filter 120. The combined effect of the transmission characteristics of filters 120 and 125 is to render green in color the beam 122 emerging from filter 125. That now green beam further passes through condenser lenses 126 to impinge on a photoresponsive device 127 similar to device 117. Device 127 generates at its output 128 an electrical signal representative of the green color component of the scanned tone values of transparency 100.

The secondary beam 123 from splitter 121 passes through a dichroic filter 130 which transmits a range of visible wavelengths effectively limited to the color blue, After emerging from filter 130, the beam 123 passes through condenser lenses 136 to impinge on a blue photoresponsive device 137 (similar to device 117) which generates at output 138 an electrical signal representative of the blue color component of the scanned tone values of transparency 100.

Figure 7:
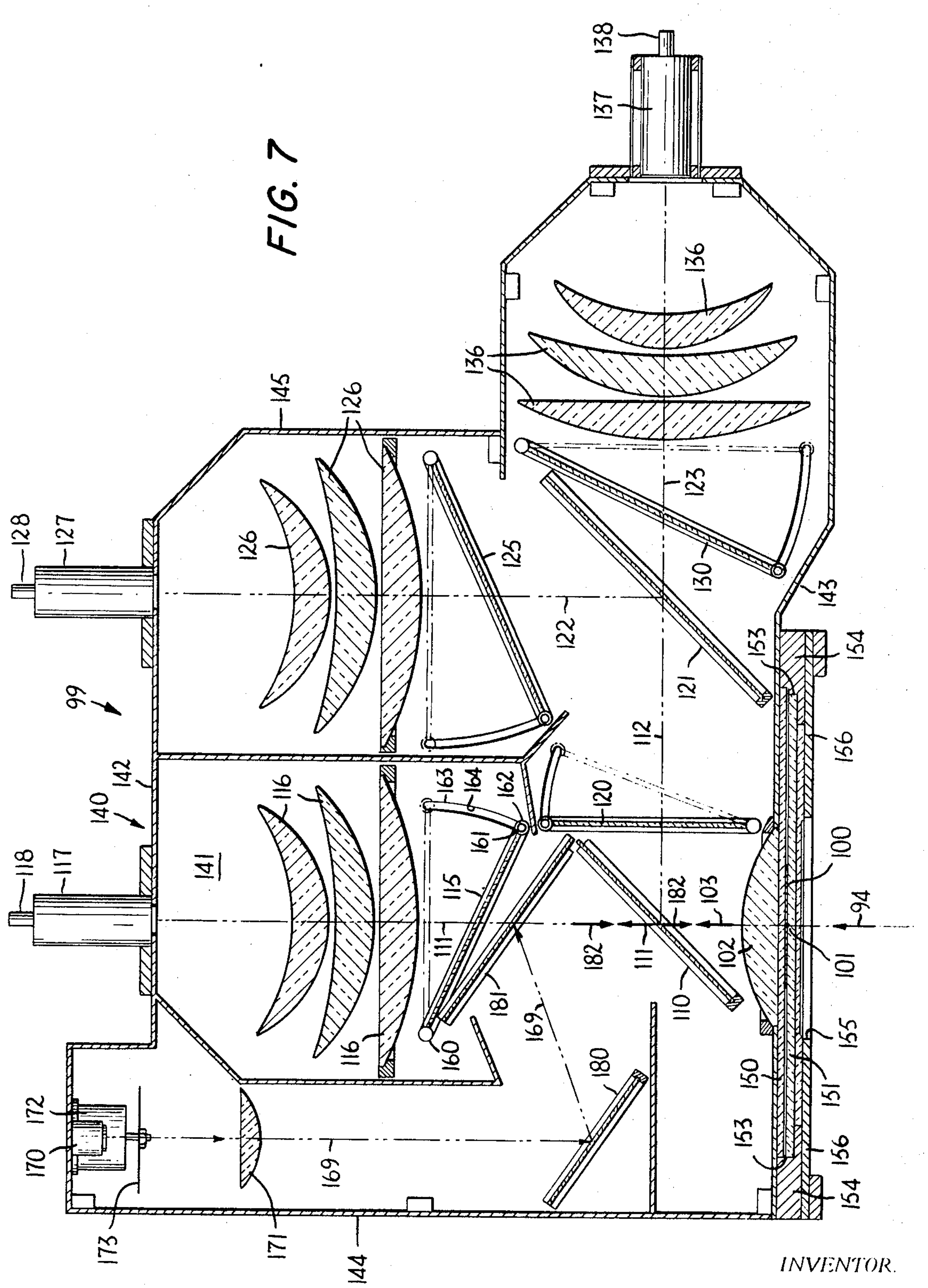
FIG. 7 is a view in front elevation of structural details of the FIG. 6 system.

The structure of the apparatus 99 of FIG. 6 is shown in detail by the front elevation view of FIG. 7 (rotated at 90° relative to FIG. 6). That structure is comprised of a light-tight housing 140 having a rear wall 141, top and bottom walls 142, 143, opposite sidewalls 144, 145 and a front wall (not shown). The width of housing 140 between its front and rear walls is narrow compared to the height and length dimensions of the housing. That narrow width permits each of the optical elements of apparatus 99 to be mounted in its shown position by being fastened to each of the front and rear walls of housing 140 by supports which are conventional unless described hereinafter.

In FIG. 7, the beam 94 passes through the copy 100 in the vertical direction which is the preferred orientation for that beam. The copy 100 is inserted into the path of beam 94 by being pressed together between glass plates 150, 151 to form a cassette which is slid horizontally into a guide way provided by slots 153 formed in the shown side members 154. Beam 94 scans the transparency contained in the slid-in cassette by passing through a hole 155 in an aluminum front plate 156.

The other details of the FIG. 7 structure should, for the most part, be evident from the showing of the figure taken together with the description already given of FIG. 6. A feature to be noted, however is the mounting of the dichroic filters. Taking as exemplary the red dichroic filter 115, that filter is hinged at its left-hand end by a horizontal pin 160 supported at its opposite ends by the rear and front walls of the housing 140. The right-hand end of filter 115 has thereon a post 161 extending horizontally and with clearance from the rear to the front wall of the housing 140. Threadedly received in post 161 at opposite ends thereof are a pair of set screws 162 (only one set screw being shown) of which the heads are on the outside of, respectively, the front and the rear walls of the housing. Each screw 162 has a threaded stem which extends from the screw head into post 161 by passing through an arcuate slot 163 in the corresponding housing wall. The slot 163 in each of the front and rear walls of housing 140 has a radial width which is smaller than the diameter of the corresponding screw head. Each slot 163 also has an arcuate centerline 164 in the form of a circular arc centered on the axis of the hinge pin 160 and subtending an angle of slightly more than 20°. The two slots 163 for filter 115 have a disposition relative to the axis of the impinging beam 111 such that the angle of incidence between the filter and the beam axis can be varied from 0° to 20° by first loosening set screws 162, then tilting filter 115 to the desired angle of incidence and then retightening the set screws to hold the filter at the selected angle of incidence. Thus, hinge pin 160 is a means permitting adjustment over a range of the angle of incidence between filter 115 and the axis of such beam, and elements 161—163 provide means for retaining such angle of incidence at a selected setting within the mentioned angular adjustment range.

As shown by FIG. 7, each of dichroic filters 120, 125 and 130 has a mounting alike to that of filter 115 and permitting the angle of incidence between the filter in question and the axis of the incident beam to be selectively adjusted to and maintained at any desired value between and including 0° and 20°. To be able to so adjust the angle of incidence of each of the four dichroic filters is advantageous for reasons later described.

A further feature of apparatus 99 which is shown by FIG. 7 (but not by FIG. 6) is an optical subsystem for projecting an image of transparency 100 on the screen 91 (FIG. 6) of the cathode-ray tube 90. In that subsystem, white light from a light source 170 is formed by a lens 171 into a beam 169 of intense light. Mounted behind (in FIG. 7) the source 170 is an electric motor 172 driving a conventional chopper wheel 173 of which the rim is disposed in the path of the light from source 170 to the lens 171. The rotation of wheel 173 by motor 172 produces in a well-known manner a chopping of the light from source 170 such that the light in beam 169 occurs in the form of intermittent pulsations of light alternating with periods of darkness. The chopping of the light preferably takes place at a rate (e.g. 30 cycles per second) greater than that at which the flicker of the light pulsations would be visible to the human eye.

The chopped beam 169 is projected to a full mirror 180 from which it is reflected to a semimirror 181 disposed in the path of beam 111 (to red photomultiplier 117) so as to be at a 45° angle of incidence to both the axis of beam 111 and the axis of beam 169. Mirror 181 is constructed to be 90 percent transmissive and 10 percent reflective. Hence, beam 111 is transmitted through mirror 181 with only slight attenuation. The light of beam 169 is reflected from mirror 181 with much attenuation but, because the light intensity of beam 169 is large to begin with, the intensity of the reflected light is appreciable. That reflected light forms a chopped beam 182 coaxial with but oppositely directed to the portion of beam 111 incident on the mirror 181.

The reversely directed chopped beam 182 is color and intensity modulated by transmission through copy 100 and is then passed back through optics 95 (FIG. 6) to produce a focused colored image of copy 100 at the cathode-ray tube 90. Because the phosphor screen coating of that tube acts, optically speaking, as a white projection screen, such colored image is clearly visible on the tube screen and, further, is seen as a continuous image with no noticeable flicker because the 30 c.p.s. chopping rate of beam 182 is above the rate at which flicker would be substantially visible. Since the described image of copy 100 is formed by the same optics 95 as that which produces the raster scanning pattern of spot 101 over transparency 100 from the raster scanning pattern of spot 93 over the tube screen 91, an optically symmetrical relation obtains between, on the one hand, the image and the raster pattern on the tube screen and, on the other hand, the color transparency and the raster scanning pattern over that transparency. Hence, by adjusting the deflection of the electron beam of tube 90 to cause the raster scanning pattern of that tube to cover a particular selected area of the copy image seen on that tube, the raster scanning pattern of spot 101 over copy 100 itself will be automatically adjusted to cover exclusively the corresponding particular area of the original copy 100. The described mode for projecting an image of copy 100 onto the cathode-ray tube provides therefore, a convenient way of lining up the scanning action of the tube with the area of the copy which is desired to be scanned.

The light projected by beam 182 onto the screen 91 of the tube 90 is reflected back by the screen to pass through apparatus 98 in the same way as does the light from tube spot 93. The brightness of the image of copy 100 projected onto the screen 91 is such that the reflected light masks the light from spot 93 in those intervals during which the chopped beam 182 is "on." Thus, if beam 182 were to be a beam of continuous light, it would be necessary to turn off light source 170 in order to make measurements at the outputs of the photomultipliers (or elsewhere) of the color component signals developed by the cathode-ray tube scanning of the copy 100.

The chopping, however, of beam 182 at, say, a 30 c.p.s. rate permits measurements to be made of the color component signals during the dark or "off" periods of beam 182 while, simultaneously, the image of copy 100 may be seen continuously on the screen of the cathode-ray tube because of the persistance of human vision. That is, measurements of such signals can be made by, say, integrating volt meters (or other integrating electrical instruments) connected to the channels for such signals by gate circuits (not shown) synchronized with the chopping action of chopper wheel 173 to pass those signals to the measuring instruments only when the beam 182 is "off."

Figure 8:
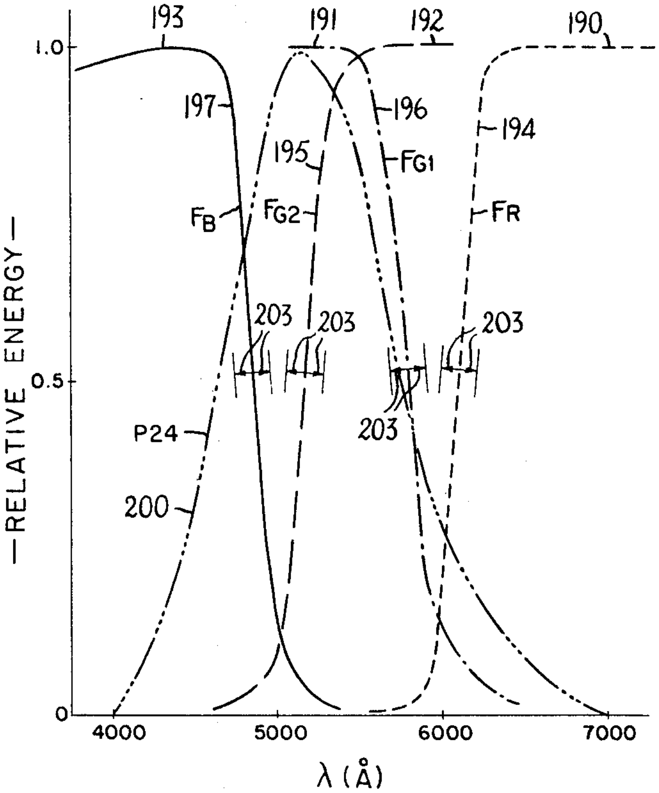
FIG. 8 is a graph of wavelength-energy transmission curves characteristic of the dichroic filters of the FIG. 6 system.

FIG. 8 shows by curves 190, 191, 192 and 193 the normalized wavelength-energy transmission response curves of, respectively, the dichroic filters 115, 120, 125 and 130. The area under each curve represents light transmitted by the corresponding filter.

Curves 190 and 192 on their leftward or lower wavelength sides are characterized by respective edges 194 and 195 (sloping downwardly from peak energy value to asymptotically approach zero energy value) which set lower limits to the wavelengths of the transmitted light. In the visible range, however, curves 190 and 192 are not characterized on their rightward or upper wavelength side by any such wavelength transmission limiting edges. Thus, the red filter 115 (corresponding to curve 190) and the green-red filter 125 (corresponding to curve 192) are high pass transmission filters.

In contrast, the curves 191 and 193 have respective edges 196 and 197 or their rightward or higher wavelength sides to set upper limits to the transmitted wavelengths, but the latter curves do not, in the visible range, have any such edges (to a significant extent) on their leftward or lower wavelength sides. It follows that the blue-green filter 125 (corresponding to curve 191) and the blue filter 130 (corresponding to curve 193) are low pass transmission filters.

Thus, the dichroic filters of the FIG. 6 system are either high pass or low pass transmission filters, but none of them, taken individually, is a band-pass filter. FIG. 2, on the other hand, shows that the wavelength-energy curves for the beams reaching the photomultipliers should be band-pass curves. The combined filtering actions of the blue-green filter 120 and the green-red filter 125 yields a band-pass curve because the light transmitted by the two filters in series is limited (FIG. 8) to the area under the curve formed by the edges 195 and 196, and such curve is a band-pass curve. No other band-pass curves, however, are formed by the filter transmission characteristics acting alone.

Even so, band-pass wavelength-energy curves for all three of the beams incident on the three photomultipliers are created by the multiplicative action on the transmission curves of the dichroic filters of the wavelength-energy or spectral energy distribution curve 200 (FIG. 8) of the P24 phosphor which generates at cathode-ray tube 90 the spot 93 of light by which the original 100 is scanned. That is, curve 200 multiplies with curve 190 (FIG. 8) to produce (after normalization) the desired red band-pass curve 45 (FIG. 2) for the red beam 111 incident on the photomultiplier 117. Further, curve 200 multiplies with the curve defined by edges 195 and 196 (and provided by the conjoint action of filters 120 and 125) to yield (after normalization) the desired green band-pass curve 46 (FIG. 2) for the green beam 122 incident on the photomultiplier 127. Still further, curve 200 multiplies with the curve 193 to yield (after normalization) the desired blue band-pass curve 45 for the blue beam 123 incident on the photomultiplier 137.

Normalization of all three of the band-pass curves 45, 46 and 47 to have the same peak energy value is effected in the FIG. 6 system by the use of neutral filters (not shown) in an appropriate one or ones of the beams incident on the photomultipliers. As an alternative to such optical normalization of the three band-pass curves, the equivalent to optical normalization can be produced by amplification or attenuation of one or ones of the respective output signals from the three photomultipliers such that the relative strengths of all three signals are the same as if the band-pass curves for the beams incident on the photomultipliers had been optically normalized.

Some advantages and further characteristics of the FIG. 6 system are as follows.

The light reflected from the described dichroic filters is directed within the FIG. 6 system so as to be absorbed on the walls of housing 140 or to be otherwise dissipated. None of such reflected light reaches the photomultipliers. Accordingly, the FIG. 6 system avoids the problem inherent in the FIG. 3 system (and described in connection with FIG. 4) wherein the use of a dichroic filter both as a beam-splitting reflector and as a transmission filter necessarily produces an overlap at 50 percent of peak energy value of the normalized band-pass curves of the beams impinging on the photomultipliers unless those curves are further trimmed by Wratten filters. That is, without anything more than the wavelength energy curve of the light from spot 93 and suitable neutral filters (or other normalizing means), the dichroic filters of FIG. 6 provide the desired normalized band-pass curves (FIG. 2) of which the overlap points have substantially less than 50 percent of the peak energy value for the curves. Hence, the FIG. 6 dichroic filters need not be and are not supplemented by any light absorbing Wratten filters or other color filtering means which would introduce inefficiency into the operation of the system.

As described, the dichroic filters of the FIG. 6 system are adjustable in a continuously variable manner in the angle of incidence made between each filter and the axis of the light beam impinging on that filter. As a result, the band-pass characteristics of the system may be easily and precisely "fine tuned" without having to contend with the problems accompanying the technique of tuning by Wratten filters of producing tuning of the band-pass curves in discrete wavelength jumps and of concurrently detuning other significant operating parameters of the system.

More specifically, as indicated by the arrows 203 in FIG. 8, the wavelength transmission limiting edge of the transmission curve of each of the FIG. 6 dichroic filters can be shifted either upward or downward in wavelength position by appropriate adjustment of the angle of incidence between that filter and the axis of the impinging beam. Since those edges can be so shifted, and since, when multiplied by the "constant" P24 phosphor curve, those "filter" edges 194, 195, 196 and 197 of FIG. 8 yield, respectively, the edges 204, 205, 206 and 207 of the band-pass curves of FIG. 2, it follows that, as indicated by arrows 209 in FIG. 2, each of those band-pass curve edges can be independently shifted either upward or downward in wavelength position by appropriate angular adjustment of the corresponding dichroic filter. The FIG. 6 system thus permits continuously variable adjustment of the effective range of wavelengths spanned by each of the red, green and blue pass bands of the system and, further, continuously variable adjustment of the energy value and wavelength position of the points of overlap of the blue and green band-pass curves and of the green and red band-pass curves.

The FIG. 6 system provides the advantages described so far whether original 100 is scanned in the manner discussed by a cathode-ray tube or, alternatively, is scanned by a stationary light beam derived in, say, the manner shown in FIG. 3. When, however, the scanning of the original is by the spot of a cathode-ray tube moving in a raster scanning pattern (or other pattern) over the screen of the tube, the FIG. 6 system has further advantages which will be made more apparent from FIG. 9.

Figure 9:
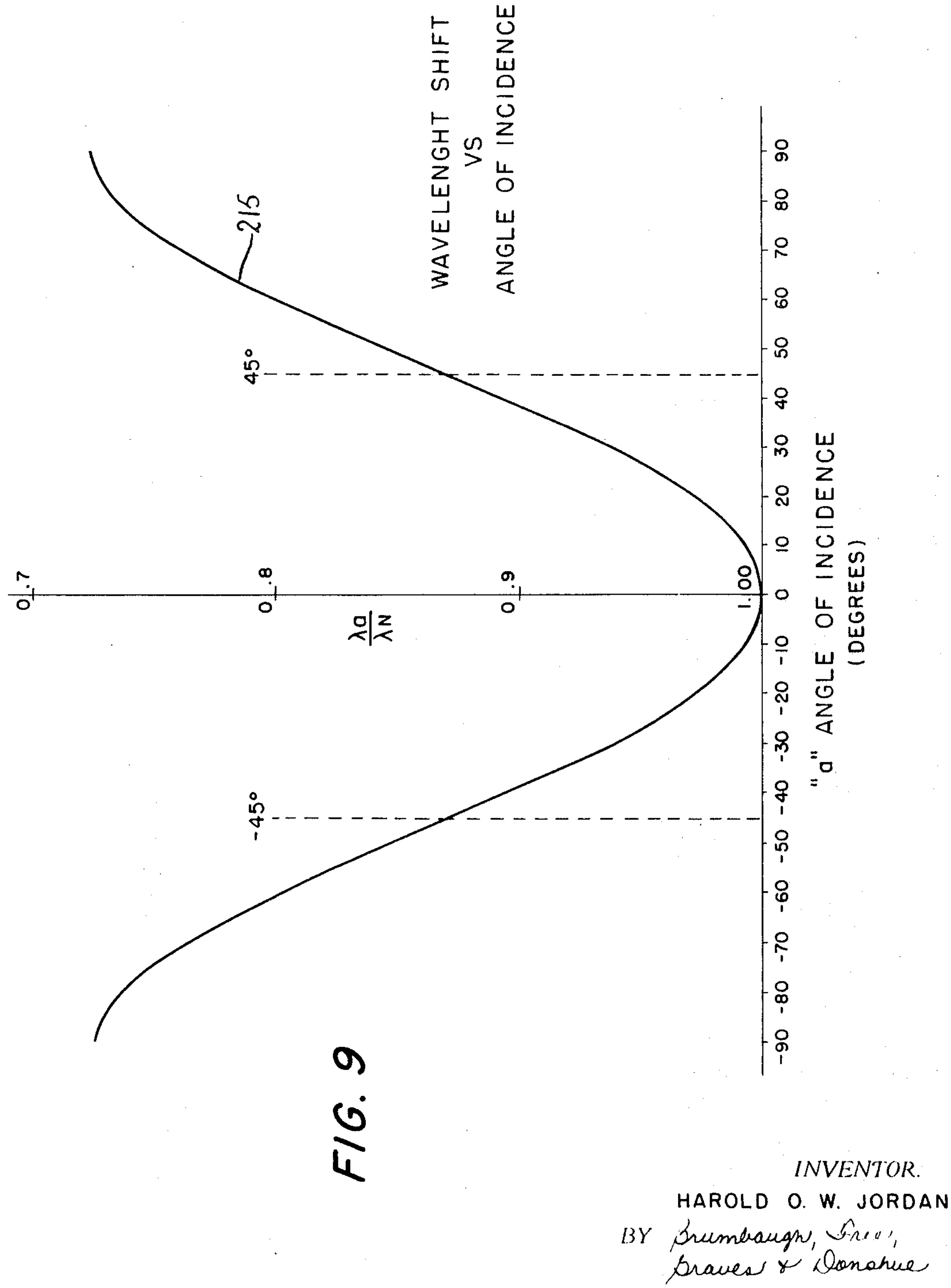
FIG. 9 is a graph of the effect on a dichroic filter of changing the angle of incidence of the light on that filter.

In the last named figure, $\lambda_N$ is the wavelength value of the peak energy wavelength passed by a dichroic filter at an angle of incidence of 0° with a beam of white light having a wavelength-energy curve the same as or similar to, the curve 200 (FIG. 8). The quantity $\lambda_a$ is the wavelength value of the peak energy wavelength passed by the filter as the angle of incidence departs from 0°. FIG. 9 shows by curve 215 the value of the ratio $\lambda_a/\lambda_N$ as a function of the angle of incidence $a$ when:

$$\frac{\lambda a}{\lambda_N}=\frac{\sqrt{n^2-\sin^2 a}}{n}$$

where $n$ equals the index of refraction of the filter and, in FIG. 9, is assumed to have a typical value of 1.45.

From FIG. 9, it will be apparent that, at or in the vicinity of $a=0°$, the rate of change of curve 215 is minimum or small, but, at or in the vicinity of $a=45°$, the rate of change of curve 215 is maximum or large. To give specific figures, at normal incidence or zero angle a change in angle of plus or minus 10° gives a $\lambda_a/\lambda_N$ of 0.993 regardless of the direction in which the change of angle is made. However at an angle of incidence of 45°, a variation in angle of plus or minus 10° from 45° would give a $\lambda_a/\lambda_N$ of either 0.918 or 0.823 depending on the direction in which the change is made. To relate the figures just given to, say, the green band-pass curve 46 of the FIG. 6 system, if the filters 120 and 125 which determine that curve were each to be at a 0° angle of incidence with the axis of the impinging beam, then a 10° departure of that beam from its nominal axis would produce a shift of only 40 Angstrom units in the peak energy wavelength of the green curve. On the other hand, if those filters were each to be at a 45° angle of incidence to the nominal axis of the impinging beam, then a 10° variation of such beam from its nominal axis could produce a shift of as much as 530 Angstrom units of the peak energy wavelength of the green band-pass curve. A wavelength shift of the last-named magnitude could, however, be disastrous because it might well result in a shifting of the peak energy wavelength of the green band-pass channel into a wavelength band intended for one of the other band-pass channels.

As discussed in connection with FIG. 5, different rays of the beam derived from cathode-ray tube scanning of the original will have different angles of incidence on a dichroic filter of FIG. 6 so as to tend to produce undesired spreading of the band-pass curves for that system. Also, as the cathode-ray tube spot moves to different positions in its raster scanning pattern, the central ray of a beam derived from that spot will vary in its angle of incidence on such filter relative to the reference incidence angle on such filter of the nominal axis of the beam, and the last named variation tends to produce undesired different color tinting of the ultimate reproduction in a manner varying from point to point over the reproduction. From FIG. 9, however, it will be clear that both undesired band-pass spreading and undesired color tinting are minimized in the FIG. 6 system because each dichroic filter of that system makes a relatively small nominal angle of incidence (0° to 20°) with the axis of the beam impinging thereon, wherefore the shift from its wavelength value at nominal incidence angle of the peak energy wavelength of the light in any beam ray diverging from nominal in its incidence angle is a shift which is much less than if the nominal angle of incidence were to be the conventional 45°. Accordingly, the FIG. 6 system provides useful color components signals derived from scanning of an original by a spot moving in a scanning pattern over the screen of a cathode-ray tube, whereas the described prior art color analyzing systems were incapable of providing useful color component signals derived from that scanning mode.

The above described embodiments being exemplary only, it is to be understood that additions thereto, modifications thereof, and omissions therefrom can be made without departing from the spirit of the invention, and that the invention comprehends embodiments differing in form and/or detail from that specifically described. For example the beam from light source 170 need not be pulsed on and off above visible flicker frequency but can be pulsed on between each line scan (occurring at a repetition rate of 4 c.p.s.) so that the pulse rate is below the visible flicker frequency.

The mode just described of pulsing source 170 eliminates the need for complex gating of the color signals. Accordingly, the invention is not to be considered as limited save as is consonant with the recitals of the following claims.

I claim:

1. In a color analyzer in which two neutral beam splitters divide an input light beam into a plurality of secondary light beams in which different beams impinge on different respective ones of a plurality of photoresponsive devices, the improvement comprising, a dichroic filter disposed in each of said secondary beams following each of said splitters and ahead of said devices to transmit different wavelength ranges of the light in such beams so as to render of different colors the beams impinging on said devices.

2. An analyzer as in claim 1 in which said dichroic filters are the only color filter means in said secondary beams.

3. An analyzer as in claim 1 in which the angle of incidence between each of said dichroic filters and the axis of the beam in which such filter is disposed is an angle of less than 45 percent.

4. An analyzer as in claim 3 in which said angle is 20° at most.

5. An analyzer as in claim 1 further comprising, means permitting adjustment over a range of the angle of incidence between each of said dichroic filters and the beam in which such filter is disposed, and means to retain each of said filters at a selected setting in its range of adjustment.

6. An analyzer as in claim 1 in which said input beam is originally of light having a wavelength-energy distribution curve characterized by a peak energy value at a wavelength corresponding to the color green, said curve being multiplicative with the wavelength-energy transmission curves of said filters to define for said impinging beams a respectively corresponding plurality of wavelength band-pass curves which are sequentially overlapping in wavelength and intersect at points which, when such curves are normalized, each have an energy value less than 50 percent of the peak energy value of said normalized band-pass curves.

7. An analyzer as in claim 6 in which each of said wavelength band-pass curves has at least one edge which is adjustable in wavelength position.

8. An analyzer as in claim 7 in which said sequentially overlapping band-pass curves are at least three in number, the middle one of such three curves has opposite edges which are each independently adjustable in wavelength position, and the two outer ones of such three curves each intersect said middle curve by an edge which is adjustable in wavelength position.

9. A color analyzer for an input light beam comprising, a first neutral beam splitter disposed in the path of said input beam to divide it into first and second beams, a second neutral beam splitter disposed in the path of said second beam to divide it into third and fourth beams, and first, second and third dichroic filters disposed in, respectively, said first, third and fourth beams to each transmit a range of wavelengths of the light in the corresponding beam, each of said filters being transmissive of a different range of wavelengths.

10. An analyzer as in claim 9 further comprising a fourth dichroic filter disposed in said second beam and transmissive both of wavelengths transmitted by said second filter and of wavelengths transmitted by said third filter.

11. In a color analyzer in which an input light beam is divided into a plurality of secondary beams by neutral beam splitters in which different beams impinge on different respective ones of a plurality of photoresponsive devices, the improvement comprising, a dichroic filter disposed in each of said secondary beams to transmit different wavelength ranges of the light in such beams so as to render of different colors the beams impinging on said devices, means permitting adjustment over a range of the angle of incidence between each of said filters and the beam transmitted therethrough to thereby permit selective variation in the range of wavelengths transmitted by that filter, and means to retain each of said filters at a selected setting in said range of angular adjustment of that filter.

12. A scanning and color analyzing system for a colored original comprising, cathode-ray tube means adapted by deflection of at least one electron beam thereof to provide a raster pattern scanning of said original by light from a spot formed by said beam on the screen of said tube means and scanning in a raster pattern over said screen, optical means disposed to form light derived from said scanning of said original into a primary beam, a plurality of neutral beam splitters disposed to divide said primary beam into a plurality of secondary beams, a plurality of photoresponsive devices each responsive to a different one of said secondary beams impinging thereon to derive from that beam an electric signal, and a dichroic filter disposed in each of said secondary beams to transmit different rages of wavelengths of the light in such beams so to render of different colors the beams impinging on said devices, each of said filters being characterized by an angle of incidence of less than 45° with the secondary beam passing through that filter.

13. A system as in claim 12 in which said spot is developed on the screen of said tube means by a phosphor imparting to the light from said spot a wavelength-energy curve multiplicative with the wavelength-energy transmission curves of said filters to define for said beams impinging on said devices a respectively corresponding plurality of wavelength band-pass curves which are sequentially overlapping in wavelength and intersect at points which, when such curves are normalized, each have any energy value less than 50 percent of the peak energy value of said normalized band-pass curves.

14. A system as in claim 13 further comprising means permitting adjustment over a range from a lower limit not less than 0° to an upper limit less than 45° of the angle of incidence between each of said dichroic filters and the beam passing therethrough so as to thereby permit adjustment of the wavelength position of at least one edge of each of said wavelength band-pass curves, and means to retain each of said dichroic filters at a selected setting in the range of angular adjustment of that filter.

15. A system as in claim 14 in which said dichroic filters are the only color filter means in said secondary beams.

16. A system as in claim 12 in which said dichroic filters are the only color filter means in said secondary beams.

PO-1050
(5/69)

UNITED STATES PATENT OFFICE
CERTIFICATE OF CORRECTION

Patent No. 3,585,281 Dated June 15, 1971

Inventor(s) Harold O. W. Jordan

It is certified that error appears in the above-identified patent and that said Letters Patent are hereby corrected as shown below:

Cover page, Item [73] Assignee, "Printing Development, Inc." should read --Printing Developments, Inc.--. Col. 1, line 69, after "are" insert --all--. Col. 2, line 16, after "27" insert a comma. Col. 3, line 65, after "beam", "of" should read --on--. Col. 4, line 40, after "tion", "of" should read --on--; line 41, "82" should read --83--; line 42, "lens 82" should read --lens 84--; line 74, after "ing" insert --in--. Col. 5, line 1, "curve" should read --curves--; line 3, after "As" insert --a--; line 29, "of" should read --or--; line 69, after "position", "of" should read --on--. Col. 6, line 54, after "(rotated", delete "at"; line 74, before "figure", "the" should read --that--. Col. 8, line 38, "persistance" should read --persistence--; line 62, after "197", "or" should read --on--. Col. 11, line 15, "components" should read --component--. Col. 12, line 45, "rages" should read --ranges--.

Signed and sealed this 21st day of December 1971.

(SEAL)
Attest:

EDWARD M.FLETCHER,JR.
Attesting Officer

ROBERT GOTTSCHALK
Acting Commissioner of Patents